United States Patent
Singgih et al.

(10) Patent No.: US 9,547,850 B1
(45) Date of Patent: Jan. 17, 2017

(54) POINT-OF-SALE SYSTEM WITH A DISPLAY VIEWING ANGLE ADJUSTMENT DEVICE

(71) Applicant: DUALITY FOCUS COMPANY LIMITED, Belize (BZ)

(72) Inventors: Khairil Singgih, City of Industry, CA (US); See-Hing Tiang, City of Industry, CA (US)

(73) Assignee: Duality Focus Company Limited, Belize (BZ)

( * ) Notice: Subject to any disclaimer, the term of this patent is extended or adjusted under 35 U.S.C. 154(b) by 0 days.

(21) Appl. No.: 14/856,767

(22) Filed: Sep. 17, 2015

(30) Foreign Application Priority Data

Aug. 6, 2015 (TW) .............................. 104212719 U

(51) Int. Cl.
| | |
|---|---|
| *H05K 7/00* | (2006.01) |
| *H05K 5/00* | (2006.01) |
| *G11B 33/02* | (2006.01) |
| *G06Q 20/20* | (2012.01) |
| *G06F 1/16* | (2006.01) |

(52) U.S. Cl.
CPC ............. *G06Q 20/20* (2013.01); *G06F 1/1601* (2013.01)

(58) Field of Classification Search
CPC ... F16M 11/10; F16M 2200/028; H04M 1/026
USPC ........................................ 361/679.01–679.23
See application file for complete search history.

(56) References Cited

U.S. PATENT DOCUMENTS

| | | | | |
|---|---|---|---|---|
| 7,850,132 | B2 * | 12/2010 | Chen | ...................... F16M 13/00 248/188.8 |
| 2005/0253040 | A1 * | 11/2005 | Yang | ...................... F16M 11/10 248/688 |
| 2010/0002129 | A1 * | 1/2010 | Zhou | ................... H04M 1/0264 348/374 |

* cited by examiner

*Primary Examiner* — Jerry Wu
(74) *Attorney, Agent, or Firm* — Rosenberg, Klein & Lee

(57) ABSTRACT

A point-of-sale (POS) system with a display viewing angle adjustment device includes an adjustment device securely mounted on a rear cover of a display and pivotally connected with a support arm of a base. The adjustment device includes a support plate and a fixing plate securely mounted on the rear cover of the display. The support plate has two side legs, and the fixing plate has two slide slots for the side legs of the support plate to slidably mount through the slide slots, such that the support plate can be moved up and down and is mounted between the screen and the fixing plate. The side legs of the support plate are pivotally connected with the support arm of the base. Because of the support of the support plate and the slide slots of the fixing plate, the screen can be moved up and down to conveniently adjust a display viewing angle.

20 Claims, 6 Drawing Sheets

POINT-OF-SALE SYSTEM WITH A DISPLAY VIEWING ANGLE ADJUSTMENT DEVICE

BACKGROUND OF THE INVENTION

1. Field of the Invention

The present invention relates to a point-of-sale (POS) system and, more particularly, to a POS system with a display viewing angle adjustment device capable of adjusting a viewing angle of a display of the POS system with a more flexible range.

2. Description of the Related Art

To keep abreast with technological progress, cash registers back in early days with tiny display and primitive sale amount counting and receipt printing functions have been advanced to latest POS systems integrating touch screen, printer and a multitude of functions in handling transactions and inventory of merchandise as a whole, thereby boosting convenience of retail vendors or store clerks in keeping track of inventory and transactions of merchandise at all times.

With reference to FIG. 6, a conventional POS system includes a base 90, a support arm 91 and a touch screen 92 pivotally mounted on the support arm 91. Because there is no enough space between the touch screen 92 and the base 90 for freely tilting the touch screen 92, the touch screen tends to hit the base 90, especially upon downward tilt of the touch screen, and is allowed for limited tilting angle adjustment. However, due to the differences in operator's height and/or operation environment, when a store clerk or a retail vendor is accessing customer pickup information or merchandise information and is also squatting to search merchandise, it is difficult and inconvenient for the store clerk or the retail vendor to view the information on the display of the POS system while remaining in a squatting position because of the limited tilting range of the touch screen 92.

SUMMARY OF THE INVENTION

An objective of the present invention is to provide a point-of-sale (POS) system with a display viewing angle adjustment device allowing to conveniently adjust the display viewing angle of a display of the POS system.

To achieve the foregoing objective, the POS system with a display viewing angle adjustment device includes a screen, a fixing plate, a support plate and a base.

The screen has a rear cover.

The fixing plate is securely mounted on the rear cover of the screen and has two slide slots formed through the fixing plate.

The support plate is mounted between the rear cover of the screen and the fixing plate and has two side legs respectively formed on and protruding rearwards from a left edge and a right edge of the support plate and slidably mounted through the respective slide slots of the fixing plate to be movable within the respective slide slots in a downward or upward direction.

The base has a support arm pivotally connected with the side legs of the support plate.

According to the foregoing structure, when users intend to increase an adjustment range of display viewing angle of the screen, a measure using the support plate and the support arm to support the screen allows the screen to be further moved up through the slid slots. Such measure can increase movement space between the screen and the base and the adjustment range of display viewing angle as well. The combination of the fixing plate and the support plate increases the range of display viewing angle and therefore renders operational convenience to users in operation of the POS system.

Other objectives, advantages and novel features of the invention will become more apparent from the following detailed description when taken in conjunction with the accompanying drawings.

DETAILED DESCRIPTION OF THE INVENTION

Figure 1:
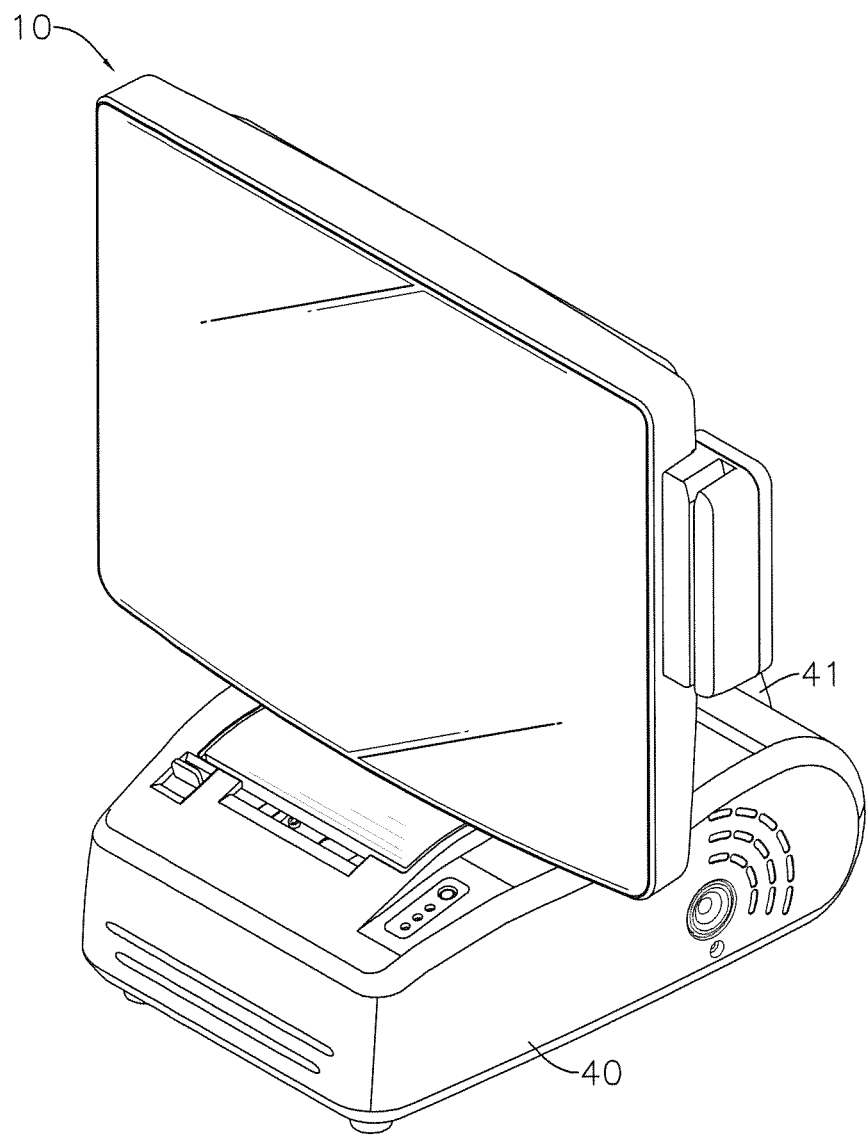
FIG. 1 is a perspective view of a POS system in accordance with the present invention.
Figure 2:
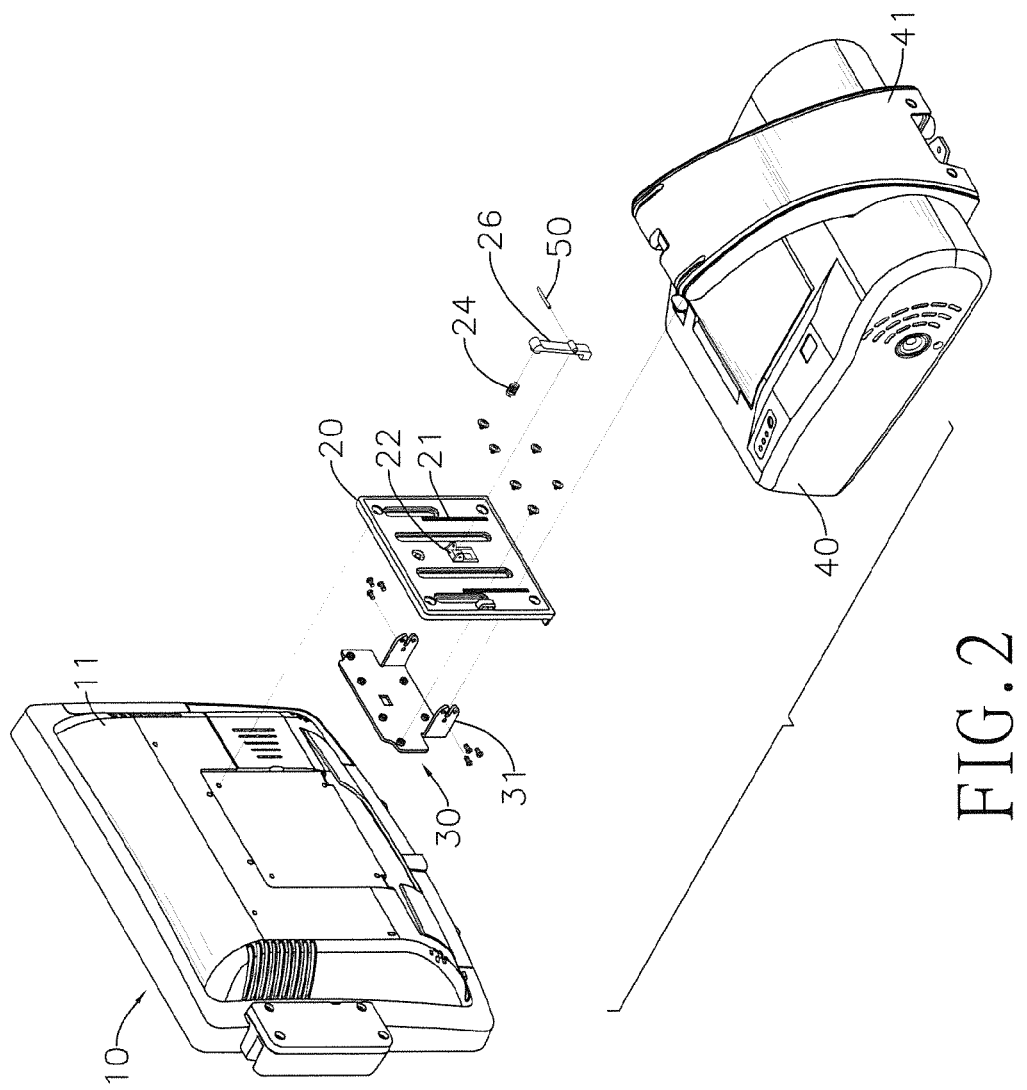
FIG. 2 is a partially exploded perspective view of the POS system in FIG. 1.

With reference to FIGS. 1 and 2, a point-of-sale (POS) system with a display viewing angle adjustment device in accordance with the present invention includes a screen 10, a fixing plate 20, a support plate 30 and a base 40. The fixing plate 20 is securely mounted on a rear cover 11 of the screen 10. The support plate 30 is mounted between the rear cover 11 of the screen 10 and the fixing plate 20. The base 40 has a support arm 41 pivotally connected with the support plate 30. The screen 10 may be a touch screen.

Figure 3:
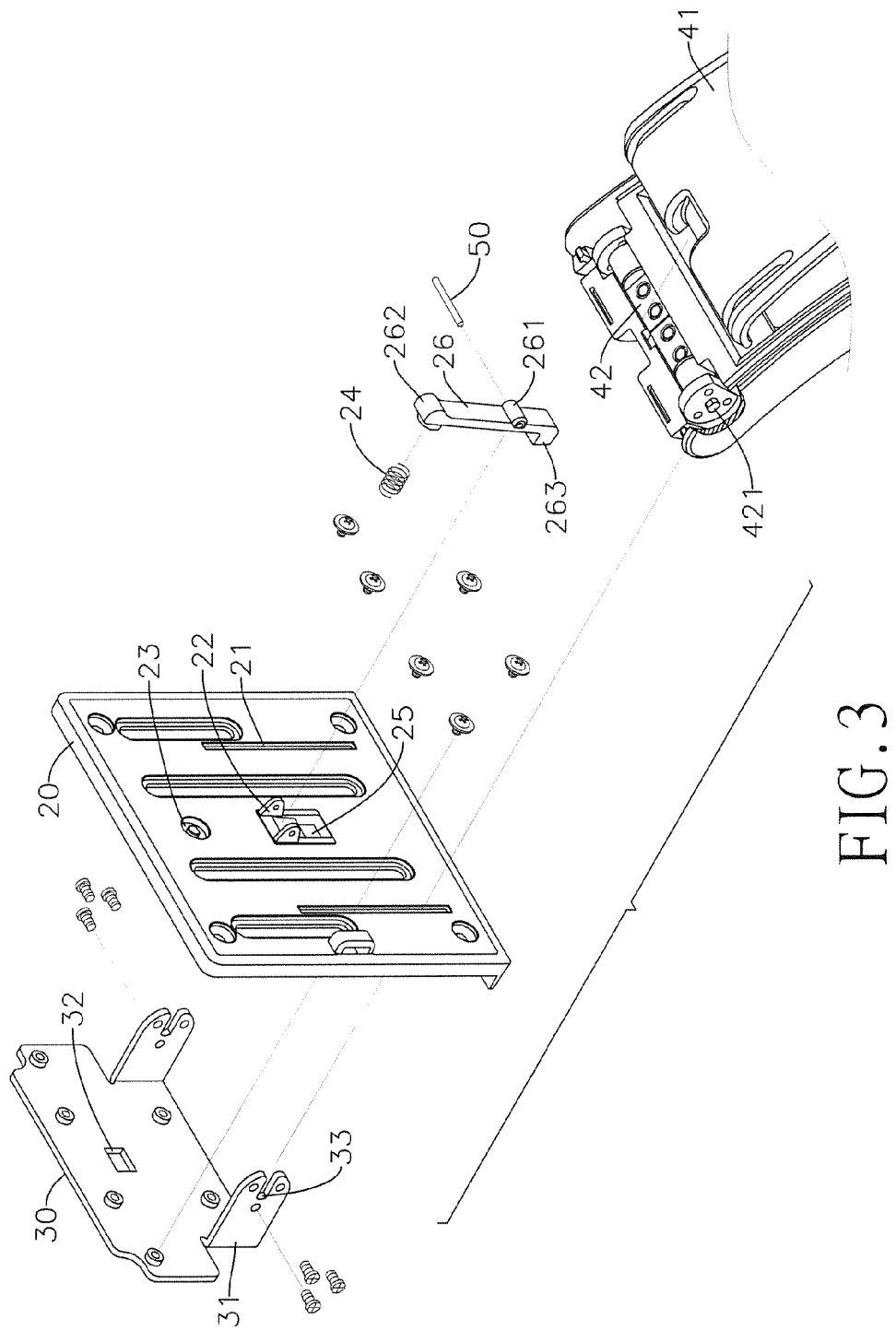
FIG. 3 is an enlarged exploded perspective view of the POS system in FIG. 2.

With reference to FIGS. 2 and 3, the fixing plate 20 has two slide slots 21, a pivot seat 22, a recess 23, resilient element 24, a first positioning hole 25, and an adjustment switch 26. The two slide slots 21 are parallelly and vertically formed through the fixing plate 20. The pivot seat 22 is mounted on a rear surface of the fixing plate 20 and is located between the two slide slots 21. The recess 23 is formed in the rear surface of the fixing plate 20 and is located above the recess 23 and between the two slide slots 21. The resilient element 24 is inserted into the recess 23. The first positioning hole 25 is formed through the fixing plate 20 and is located below the pivot seat 22 and between the two slide slots 21. The adjustment switch 26 is elongated in a vertical direction, is pivotally mounted on the pivot seat 22, and has a pivoting portion 261, a pressing portion 262 and a positioning protrusion 263. The pivoting portion 261 is formed on a rear surface of the adjustment switch 26 and is located between a top end and a bottom end of the adjustment switch 26. A pin 50 is mounted through the pivoting portion 261 and the pivot seat 22 of the fixing plate 20 for the adjustment switch 26 to be pivotable with respect to the pivot seat 22. The pressing portion 262 is formed on the top end of the adjustment switch 26, and corresponds to the recess 23 of the fixing plate 20. The positioning protrusion 263 is formed on a front surface of the adjustment switch 26, is located at the bottom end of the adjustment switch 26, and corresponds to the first positioning hole 25 of the fixing plate 20. Before the pressing portion 262 is pressed, the positioning protrusion 263 is kept in the first positioning hole 25. When the pressing portion 262 is pressed, the pressing portion 262 is inserted into the recess 23 and compresses the resilient element 24 while the positioning protrusion 263 escapes from the first positioning hole 25. After the pressing portion 262 is released, the elastic restoring force of the resilient element 24 ejects the pressing portion 262 and the positioning protrusion 263 returns to the first positioning hole 25. In the present embodiment, the resilient element 24 is a spring.

The fixing plate 20 has four corners with one through hole formed through each corner. The rear cover 11 of the screen 10 has four threaded holes formed in the rear cover 11 and corresponding to the four respective through holes of the fixing plate 20. Four bolts are respectively mounted through the fixing plate 20 and mounted in the rear cover 11 of the screen 10 to fasten the fixing plate 20 on the rear cover 11 of the screen 10.

The support plate 30 has two side legs 31 and a second positioning hole 32. The two side legs 31 are respectively formed on and protrude rearwards from a left bottom edge and a right bottom edge of the support plate 30, are respectively and slidably mounted through the slide slots 21 of the fixing plate 20 to be movable within the respective slide slots 21 in a downward or upward direction, and are pivotally connected with two opposite portions of a top end of the support arm 41 of the base 40, such that the screen 10 is supported by the support plate 30 and the support arm 41 and can be moved up and down along the two slide slots 21. The second positioning hole 32 is formed through the support plate 30 and corresponds to the first positioning hole 25 of the fixing plate 20.

The fixing plate 20 further has multiple slotted holes vertically formed through the fixing plate 20. The support plate 30 also has multiple threaded holes corresponding to the respective slotted holes of the fixing plate 20, such that multiple bolts can be sequentially mounted through the respective slotted holes of the fixing plate 20 and mounted in the respective threaded holes of the support plate 30 for the support plate 30 to be held between the screen 10 and the fixing plate 20 and to be movable in downward and upward direction with respect to the fixing plate 20.

With reference to FIG. 3, the support arm 41 further has a pivoting member 42 mounted inside the top end of the support arm 41. The pivoting member 42 is cylindrical and has two leg rests 421 respectively formed on and protruding outwards from a left end face and a right end face of the pivoting member 42. In the present embodiment, each side leg 31 has a guide slot 33 formed in a free end of the side leg 31, corresponding to one of the leg rests 421, and pivotally connected to the leg rest 421. The pivoting member 42 further has multiple threaded holes formed in the left end face and the right end face of the pivoting member 42. Each side leg 31 also has multiple threaded holes formed through the side leg 31 and corresponding to the multiple threaded holes on one of the left end face and the right end face of the pivoting member 42. Multiple bolts can be sequentially mounted through the respective threaded holes on the side legs 31 of the support plate 30 and the respective threaded holes on the left end face and the right end face of the pivoting member 42 to respectively fasten the side legs 31 on the left end face and the right end face of the pivoting member 42, such that the screen 10 can be securely connected with the pivoting member 42 upon being tilted.

Figure 4:
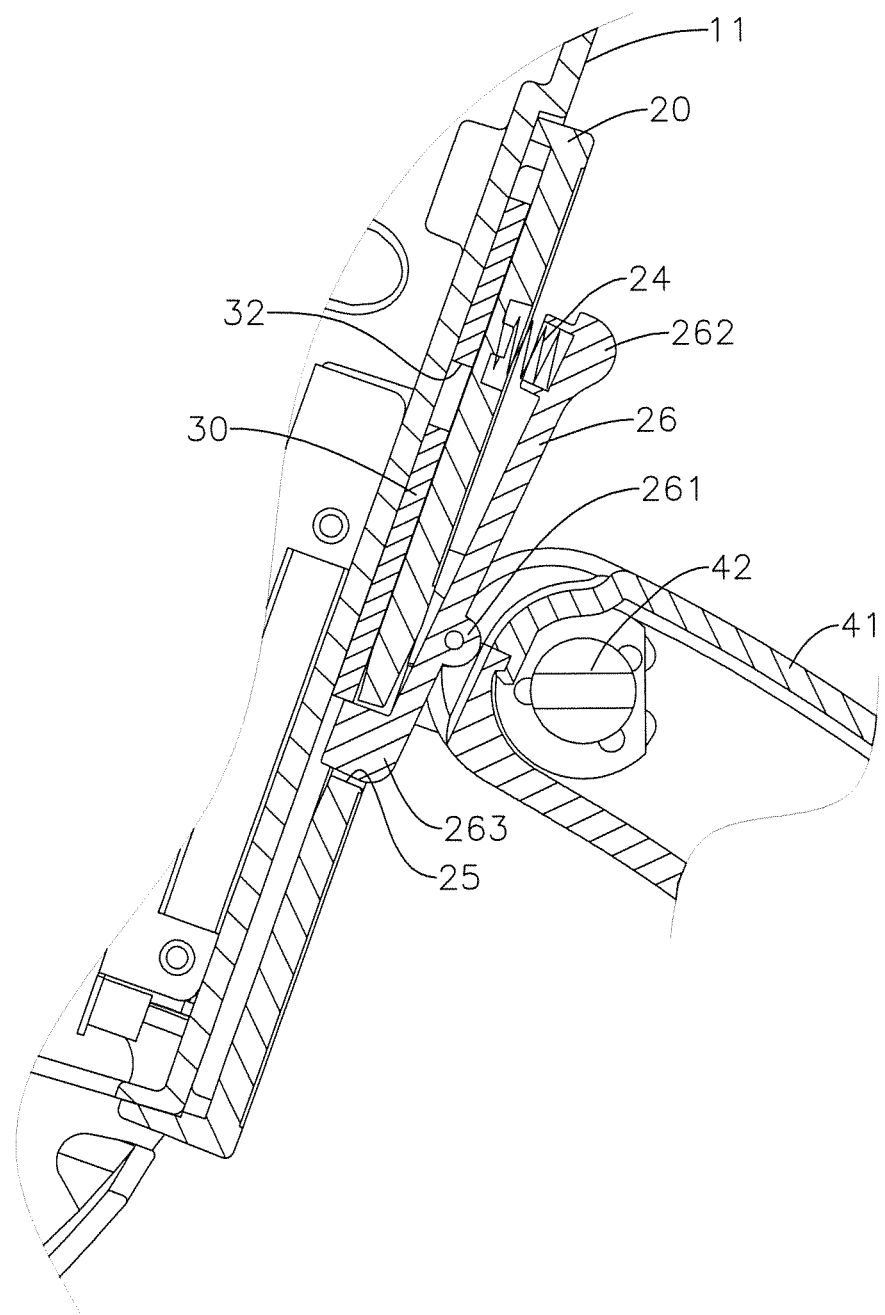
FIG. 4 is an operational side view in partial section of a display viewing angle adjustment device of the POS system in FIG. 2.
Figure 5:
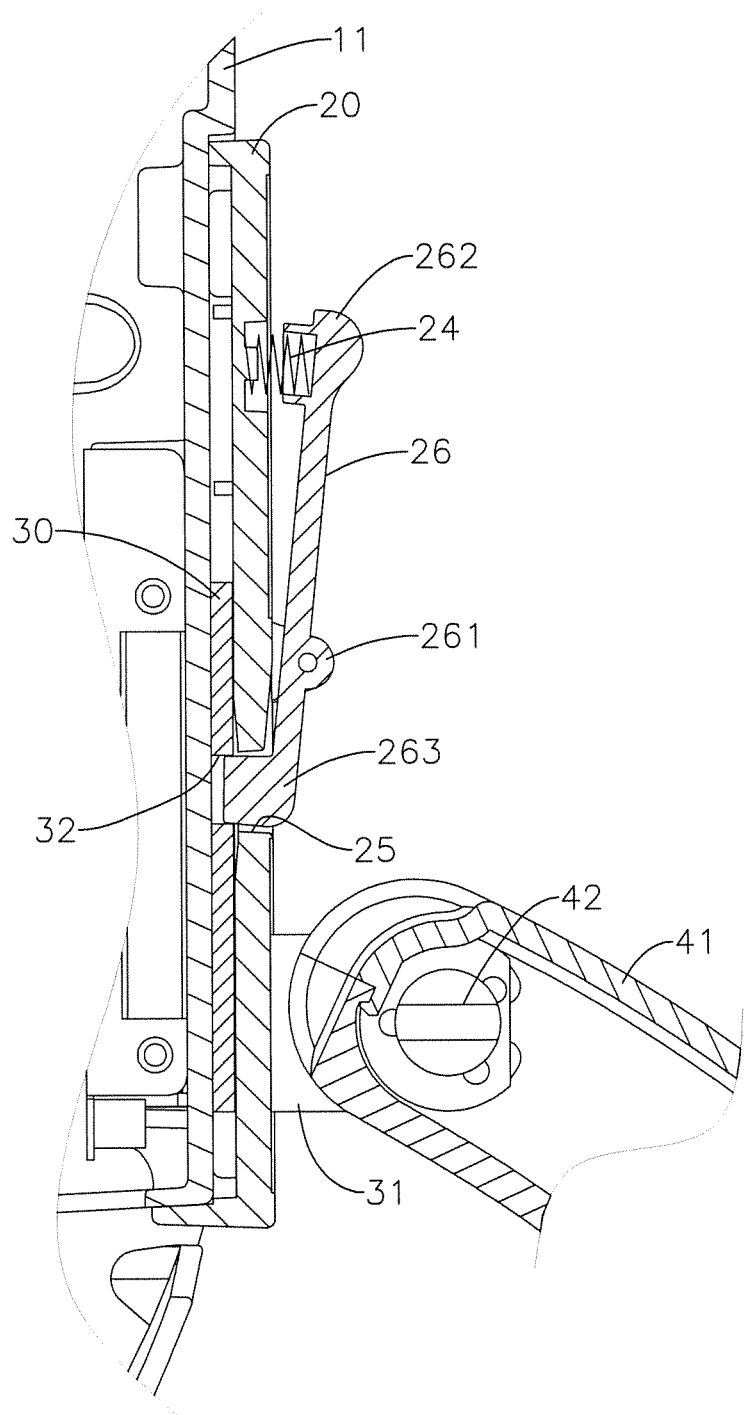
FIG. 5 is another operational side view in partial section of a display viewing angle adjustment device of the POS system in FIG. 2.
Figure 6:
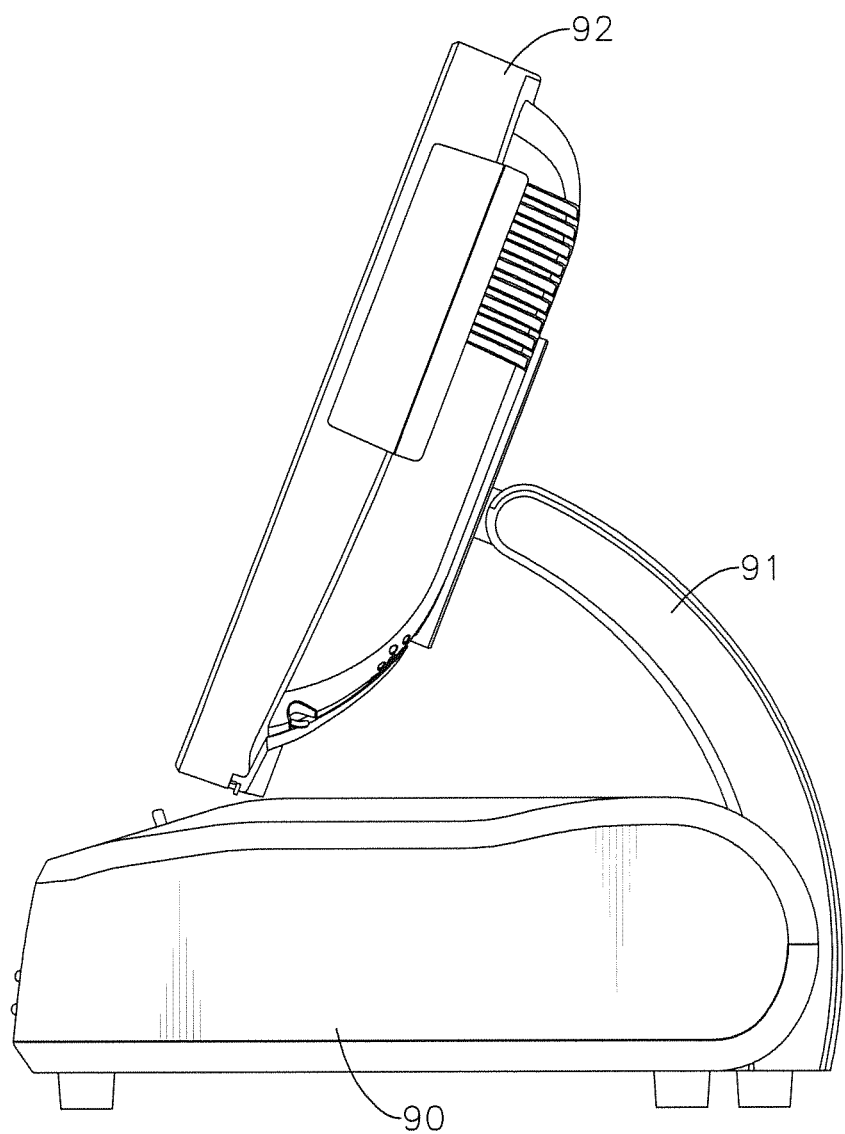
FIG. 6 is a conventional POS system.

With reference to FIGS. 4 and 5, operation of the POS system is described as follows. When the screen 10 is adjusted and lifted up to an upper limit point along a vertical direction, the positioning protrusion 263 of the adjustment switch 26 engages the first positioning hole 25 of the fixing plate 20 and a lower edge of the support plate 30. When the screen 10 is adjusted and lowered to a lower limit point along the vertical direction, the positioning protrusion 263 of the adjustment switch 26 of the adjustment switch 26 engages the first positioning hole 25 of the fixing plate 20 and abuts against the second position hole 32. Therefore, when moved up or down to the upper limit point or the lower limit point, the screen 10 can be fixed at the position.

When users intend to adjust viewing angle of the screen 10, supposing that the screen 10 is intended to tilt in a downward direction, the screen 10 needs to be lifted up in the vertical direction first. First of all, the pressing portion 262 of the adjustment switch 26 is pressed to compress the resilient element 24. The positioning protrusion 263 of the adjustment switch 26 disengages from the first positioning hole 25 of the fixing plate 20 and the lower edge of the support plate 30 and the screen 10 can be lifted up until the screen 10 reaches the upper limit point. Meanwhile, the second positioning hole 32 of the support plate 30 is aligned with the first positioning hole 25 of the fixing plate 20. After the pressing portion 262 of the adjustment switch 26 is released, the elastic restoring force of the resilient element 24 brings the positioning protrusion 263 back to the first positioning hole 25 of the fixing plate 20 and the second positioning hole 32 of the support plate 30, thereby securing the screen 10 fixed at the adjusted viewing angle and ruling out the chance of sliding movement.

Because a movement space between the screen 10 and the base 40 is available after users lift up the screen vertically, the movement space allows the screen 10 to tilt down. Given the foregoing structure and operation, tilting angle of the screen becomes more flexible and the range of viewing angle of the screen can be further increased.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A point-of-sale (POS) system with a display viewing angle adjustment device, comprising: a screen having a rear cover;

a fixing plate securely mounted on the rear cover of the screen and having a first position hole and two slide slots formed through the fixing plate; a support plate mounted between the rear cover of the screen and the fixing plate, and having a second position hole and two side legs respectively formed on and protruding rearwards from a left edge and a right edge of the support plate and slidably mounted through the respective slide slots of the fixing plate to be movable within the respective slide slots in a downward or upward direction; and a base having a support arm pivotally connected with the side legs of the support plate; and an adjustment switch is pivotally mounted on a pivot seat, and having a protrusion on one end and a pressing portion on opposite end; when the pressing portion is pressed, the protrusion is released from the first position hole and the support plate is movable to align with the second hole or a lower edge to the first position hole; and when the pressing portion is released, the pressing portion is biased by an elastic force and the protrusion is inserted into the first position hole and configured to engage the second position hole in a lower position and the lower edge in a higher position.

2. The POS system as claimed in claim 1, wherein the fixing plate further has:
   the pivot seat mounted on a rear surface of the fixing plate and located between the two slide slots;
   a recess formed in the rear surface of the fixing plate and located above the pivot seat and between the two slide slots;
   a resilient element inserted into the recess; and
   the first position hole formed through the fixing plate and located below the pivot seat and between the two slide slots.

3. The POS system as claimed in claim 2, wherein the fixing plate further has the adjustment switch being elongated in a vertical direction, pivotally mounted on the pivot seat, and having:
   a pivoting portion pivotally mounted to the pivot seat;
   the pressing portion formed on a top end of the adjustment switch and corresponding to the recess; and
   the position protrusion formed on a front surface of the adjustment switch, located at a bottom end of the adjustment switch, and corresponding to the first positioning hole.

4. The POS system as claimed in claim 3, wherein the support plate further has the second position hole formed through the support plate and corresponding to the first positioning hole of the fixing plate, and the positioning protrusion of the adjustment switch engages the first positioning hole of the fixing plate and the second positioning hole of the support plate.

5. The POS system as claimed in claim 4, wherein the support arm of the base has a pivoting member mounted inside a top end of the support arm, and the pivoting member is cylindrical and has two leg rests respectively formed on and protruding outwards from a left end face and a right end face of the pivoting member.

6. The POS system as claimed in claim 5, wherein each side leg of the support plate has a guide slot formed in a free end of the side leg, corresponding to one of the leg rests of the pivoting member, and pivotally connected to the leg rest.

7. The POS system as claimed in claim 2, wherein the resilient element is a spring and the screen is a touch screen.

8. The POS system as claimed in claim 3, wherein the resilient element is a spring and the screen is a touch screen.

9. The POS system as claimed in claim 4, wherein the resilient element is a spring and the screen is a touch screen.

10. The POS system as claimed in claim 5, wherein the resilient element is a spring and the screen is a touch screen.

11. The POS system as claimed in claim 6, wherein the resilient element is a spring and the screen is a touch screen.

12. The POS system as claimed in claim 1, wherein when the screen is moved upwards, a movement space is generated between the screen and the base.

13. The POS system as claimed in claim 2, wherein when the screen is moved upwards, a movement space is generated between the screen and the base.

14. The POS system as claimed in claim 3, wherein when the screen is moved upwards, a movement space is generated between the screen and the base.

15. The POS system as claimed in claim 4, wherein when the screen is moved upwards, a movement space is generated between the screen and the base.

16. The POS system as claimed in claim 5, wherein when the screen is moved upwards, a movement space is generated between the screen and the base.

17. The POS system as claimed in claim 6, wherein when the screen is moved upwards, a movement space is generated between the screen and the base.

18. The POS system as claimed in claim 7, wherein when the screen is moved upwards, a movement space is generated between the screen and the base.

19. The POS system as claimed in claim 8, wherein when the screen is moved upwards, a movement space is generated between the screen and the base.

20. The POS system as claimed in claim 9, wherein when the screen is moved upwards, a movement space is generated between the screen and the base.

* * * * *